(12) United States Patent
Saito

(10) Patent No.: US 10,593,973 B2
(45) Date of Patent: Mar. 17, 2020

(54) FUEL CELL SYSTEM AND METHOD FOR CONTROLLING FUEL CELL SYSTEM

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/028,060

(22) Filed: Jul. 5, 2018

(65) Prior Publication Data

US 2019/0013536 A1  Jan. 10, 2019

(30) Foreign Application Priority Data

Jul. 7, 2017 (JP) .................... 2017-133251

(51) Int. Cl.
| | |
|---|---|
| *B60L 50/60* | (2019.01) |
| *H01M 8/04858* | (2016.01) |
| *H01M 8/04664* | (2016.01) |
| *H01M 8/04537* | (2016.01) |
| *B60L 3/00* | (2019.01) |

(Continued)

(52) U.S. Cl.
CPC ....... *H01M 8/04932* (2013.01); *B60L 3/0053* (2013.01); *B60L 50/60* (2019.02); *B60L 50/75* (2019.02); *B60L 58/40* (2019.02); *H01M 8/0494* (2013.01); *H01M 8/04552* (2013.01); *H01M 8/04619* (2013.01); *H01M 8/04664* (2013.01); *H01M 8/04671* (2013.01); *H01M 2250/20* (2013.01)

(58) Field of Classification Search
CPC ............. H02J 7/1415; H01M 8/04552; H01M 8/04619; H01M 8/04932; B60L 50/60; B60L 53/54
USPC .......................... 320/101, 104; 429/413, 431
See application file for complete search history.

(56) References Cited

U.S. PATENT DOCUMENTS

| | | | |
|---|---|---|---|
| 2008/0280176 A1* | 11/2008 | Fukuda | ............ H01M 8/04097 429/430 |
| 2010/0068576 A1 | 3/2010 | Hamada et al. | |

(Continued)

FOREIGN PATENT DOCUMENTS

| | | |
|---|---|---|
| DE | 112008001357 B4 | 2/2015 |
| DE | 102015117096 A1 | 4/2016 |

(Continued)

*Primary Examiner* — Edward Tso
*Assistant Examiner* — Aaron Piggush
(74) *Attorney, Agent, or Firm* — Hunton Andrews Kurth LLP

(57) ABSTRACT

A fuel cell system incorporated in a vehicle includes a fuel cell that uses a reaction gas to generate electric power and a controller. When output restriction that restricts the electric power output by the fuel cell is performed, (a) the controller does not store a content of the performed output restriction as a history in a case where a throttle opening of a throttle is smaller than an opening threshold or an output request is smaller than an output threshold, the output request being issued to the fuel cell and set in accordance with the throttle opening, and (b) the controller stores the content of the performed output restriction as a history in a case where a condition specified in advance is satisfied while the throttle opening is greater than the opening threshold and the output request is greater than the output threshold.

6 Claims, 5 Drawing Sheets

(51) Int. Cl.
    *H01M 8/04828* (2016.01)
    *B60L 58/40* (2019.01)
    *B60L 50/75* (2019.01)

(56) References Cited

U.S. PATENT DOCUMENTS

| | | |
|---|---|---|
| 2013/0059215 A1 | 3/2013 | Kawahara et al. |
| 2013/0095405 A1 | 4/2013 | Kawahara et al. |
| 2016/0116450 A1 | 4/2016 | Saito |
| 2016/0344048 A1* | 11/2016 | Chen ................ H01M 8/04604 |
| 2016/0380295 A1 | 12/2016 | Naganuma et al. |

FOREIGN PATENT DOCUMENTS

| | | |
|---|---|---|
| DE | 102016110560 A1 | 12/2016 |
| JP | 2011249078 A | 12/2011 |
| JP | 2012009406 A | 1/2012 |

* cited by examiner

FUEL CELL SYSTEM AND METHOD FOR CONTROLLING FUEL CELL SYSTEM

CROSS REFERENCE TO RELATED APPLICATIONS

The present application claims the priority based on Japanese Patent Application No. 2017-133251 filed on Jul. 7, 2017, the disclosure of which is hereby incorporated by reference in its entirety.

BACKGROUND

Field

The present disclosure relates to a fuel cell system and a method for controlling a fuel cell system.

Related Art

In a fuel cell system incorporated in a vehicle, the output from a fuel cell is temporarily restricted in some cases to maintain appropriate control. For example, in the technologies described in Japanese Patent Laid-Open Nos. 2012-009406 and 2011-249078, during the operation of a fuel cell system, when a negative cell voltage is produced and detected in any of a plurality of cells contained in a fuel cell, the output from the fuel cell is restricted.

A vehicle control history of a fuel cell vehicle saves a variety of events having occurred in a fuel cell system. The vehicle control history is used in maintenance, repair, and other services in a service shop or at any other location. In a case where the output from a fuel cell is restricted during the operation of the fuel cell system, the vehicle control history saves the content of the performed restriction on the output from the fuel cell.

A memory area allocated for storing the vehicle control history is limited in accordance with the size of the memory incorporated in the vehicle. The number of allocatable areas for storing the content of the restriction on the output from the fuel cell is also therefore limited. In an aspect in which all events of the performed output restriction are stored whenever each of the events occurs, and in a case where the output restriction has been performed multiple times greater than or equal to the number of restrictions storable in allocated areas, the content of newly performed output restriction undesirably is written in the area where the output restriction stored before is present and therefore overwrites the previous content. As a result, the content of the output restriction stored before is likely to be lost.

The restriction on the output from a fuel cell is classified into (i) output restriction of first type in which a user's output request is not satisfied and the user therefore feels that something is wrong and (ii) output restriction of a second type that is performed with the user's output request being satisfied in accordance with system restriction specified in advance to maintain an appropriate system control action so that the user does not feel that something is wrong. In the aspect in which the performed output restriction is each stored whenever the output restriction occurs, and in the case where the output restriction of the first type is overwritten and lost, the output restriction history saved in the vehicle control history cannot be used in a service shop or at any other location, so that the situation in which the erased output restriction of the first type caused the user to feel something was wrong cannot be solved.

SUMMARY

According to a form of the present disclosure, a fuel cell system incorporated in a vehicle is provided. The fuel cell system includes a fuel cell that uses a reaction gas to generate electric power and a controller that controls the electric power generation performed by the fuel cell. When output restriction that restricts the electric power output by the fuel cell is performed, (a) the controller does not store a content of the performed output restriction as a history in a case where a throttle opening of a throttle is smaller than an opening threshold or an output request is smaller than an output threshold, the throttle accepting an instruction of adjusting a speed of the vehicle, the output request being issued to the fuel cell and set in accordance with the throttle opening, and (b) the controller stores the content of the performed output restriction as a history in a case where a condition specified in advance is satisfied while the throttle opening is greater than the opening threshold and the output request is greater than the output threshold.

DETAILED DESCRIPTION

A. Embodiment

Figure 1:
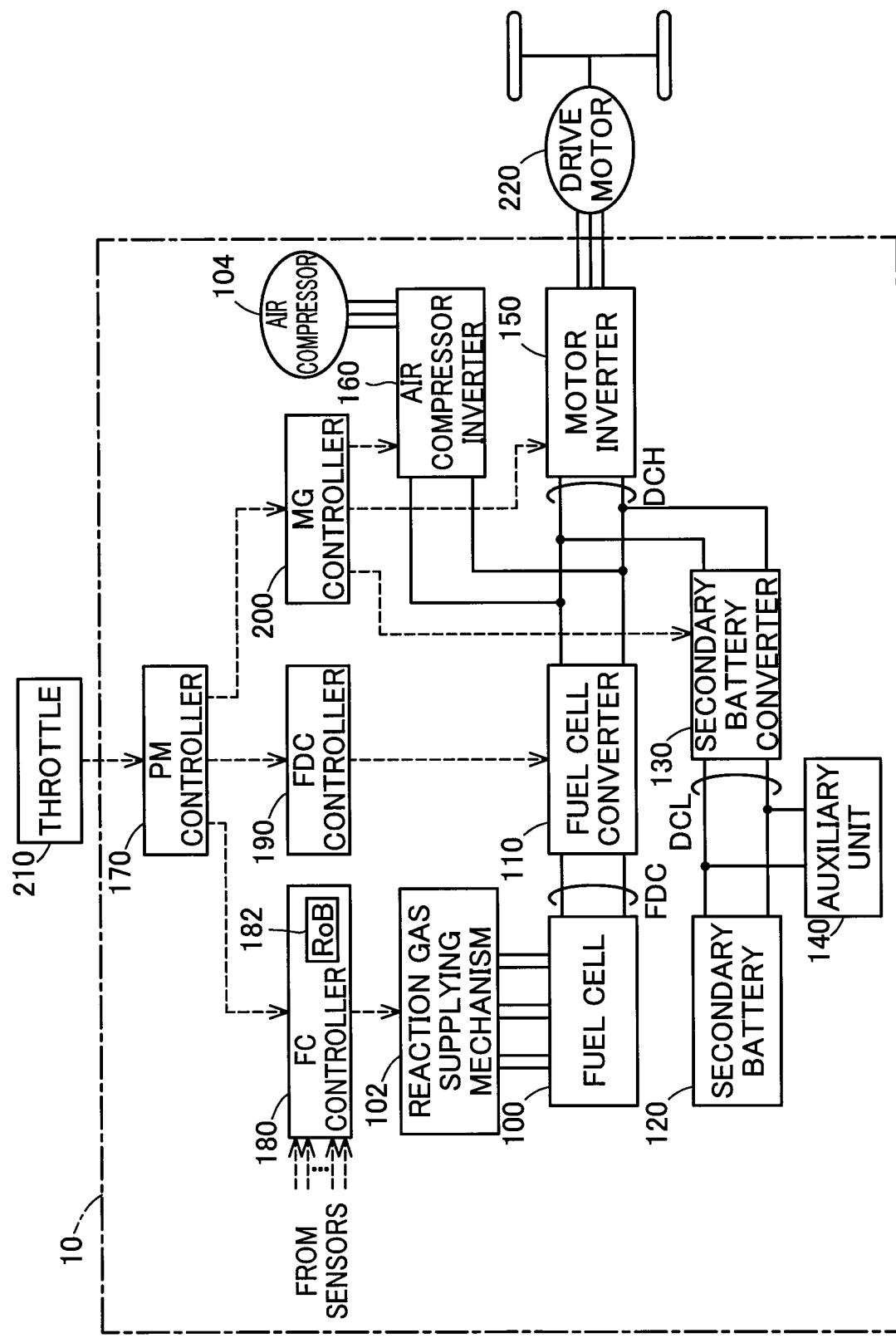
FIG. 1 is a block diagram showing a schematic configuration of a fuel cell system according to an embodiment of the present disclosure.

FIG. 1 is a block diagram showing a schematic configuration of a fuel cell system 10 according to an embodiment of the present disclosure. The fuel cell system 10 is equipped as a power supply of a vehicle driven by a drive motor 220. The fuel cell system 10 includes a fuel cell 100, a fuel cell converter 110, a secondary battery 120, a secondary battery converter 130, an auxiliary unit 140, a motor inverter 150, an air compressor inverter 160, a PM controller 170, an FC controller 180, an FDC controller 190, and an MG controller 200. The fuel cell system 10 further includes a reaction gas supplying mechanism 102 and an air compressor 104, which is part of the reaction gas supplying mechanism 102. The fuel cell system 10 starts when a power switch that is not shown is turned on and stops when the power switch is turned off. The fuel cell system 10 is further provided with a variety of sensors (not shown) for detecting the temperatures of a fuel tank and the fuel cell, the flow rate, pressure, and the temperature of each reaction gas (hydrogen, air), the temperature of cooling water, the flow rate of the cooling water, the operation states of a variety of valves, the numbers of revolutions and other operation states of the air compressor and a hydrogen pump, and other factors, a cell monitor (not shown) that detects each cell voltage in the fuel cell, and other components.

The fuel cell 100 is a unit that generates electric power based on an electrochemical reaction between hydrogen and oxygen, each of which is a reaction gas, and functions as an electric power source of the fuel cell system 10. The fuel cell 100 is formed by layering a plurality of single cells. Each single cell is a power generating element capable of electric power generation by itself and includes a membrane electrode/gas diffusing layer bonded body formed of a membrane electrode bonded body including an electrolyte membrane with gas diffusing layers provided on opposite surfaces of the membrane electrode bonded body and separators provided on opposite outer sides of the membrane electrode/gas diffusing layer bonded body. The electrolyte membrane is formed of a solid polymer thin membrane showing good proton conductivity in a damp state in which the electrolyte membrane contains water. The fuel cell 100 can employ any of a variety of types. In the present embodiment, the fuel cell 100 is a solid-polymer-type fuel cell. The fuel cell 100 is electrically connected to the fuel cell converter 110 via FC output wiring lines FDC.

The reaction gas supplying mechanism 102 includes a fuel gas supplying section, an oxidizing gas supplying section, and a coolant supplying section. The fuel gas supplying section supplies the anode of the fuel cell 100 with hydrogen, which is a fuel gas (also called "anode gas"). The oxidizing gas supplying section supplies the cathode of the fuel cell 100 with air containing oxygen, which is an oxidizing gas (also called "cathode gas"). The coolant supplying section supplies a coolant channel of the fuel cell 100 with a cooling medium (cooling water, for example). No illustration or description of the supplying sections will be made. The air compressor 104 is part of the oxidizing gas supplying section and supplies the cathode of the fuel cell 100 with air.

The fuel cell converter 110 is a step-up converter and performs step-up action of stepping up the output voltage from the fuel cell 100 to target voltage. The fuel cell converter 110 includes a reactor and a switching element that are not shown, and the switching element controls conduction of electricity to the reactor. Magnetic energy accumulated in the reactor during the turn-on period of the switching element serves as induction voltage during the turn-off period of the switching element. The induction voltage is added to the output voltage from the fuel cell 100, and the resultant voltage is output. The step-up operation is thus achieved. The fuel cell converter 110 thus performs the switching operation to convert the output voltage from the fuel cell 100. The fuel cell converter 110 is connected electrically in parallel to the motor inverter 150 and the air compressor converter 160 via high-voltage DC wiring lines DCH.

The secondary battery 120, along with the fuel cell 100, functions as an electric power source of the fuel cell system 10. In the present embodiment, the secondary battery 120 is formed of a lithium ion battery. In other embodiments, the secondary battery 120 may be a lead storage battery, a nickel-cadmium battery, a nickel-hydrogen battery, or a battery of any other type. The secondary battery 120 is electrically connected to the secondary battery converter 130 via low-voltage DC wiring lines DCL.

The secondary battery converter 130 is a step-up/step-down converter and has a configuration similar to the configuration of the fuel cell converter 110. The secondary battery converter 130 is connected electrically in parallel to the fuel cell converter 110/the motor inverter 150 and the air compressor inverter 160 via the high-voltage DC wiring lines DCH. The secondary battery converter 130 adjusts the voltage across the high-voltage DC wiring lines DCH, which is input voltage to the motor inverter 150 and the air compressor inverter 160, to charge/discharge the secondary battery 120.

The secondary battery converter 130 converts the output voltage from the secondary battery 120 and outputs the electric power from the secondary battery 120 to the high-voltage DC wiring lines DCH when the output electric power from the fuel cell converter 110 is lower than the target output electric power. The output electric power from the secondary battery 120 is supplied to the drive motor 220 and the air compressor 104 via the motor inverter 150 and the air compressor inverter 160. On the other hand, when the drive motor 220 produces regenerative electric power, the secondary battery converter 130 converts the voltage of the regenerative electric power and outputs the regenerative electric power to the low-voltage DC wiring lines DCL. The secondary battery converter 130 can convert the output voltage from the fuel cell 100 and output the output electric power from the fuel cell 100 to the low-voltage DC wiring lines DCL. As a result, the output electric power from the fuel cell 100 can charge the secondary battery 120 and can be supplied to the auxiliary unit 140. The secondary battery converter 130 may have a configuration different from the configuration of the fuel cell converter 110.

In the state in which the output electric power from the fuel cell converter 110 is lower than the target output electric power, conceivable cases in which the output electric power from the secondary battery 120 is used include the following cases:

A case where the vehicle is set in advance to travel based not on the output electric power from the fuel cell 100 but on the output electric power from the secondary battery 120 (hereinafter also called "electric vehicle (EV) traveling"), as will be described later; and A case where during the operation of the fuel cell 100 (during electric power generation action), the output electric power from the fuel cell 100 is temporarily restricted (hereinafter also called "restriction on output from fuel cell 100") to maintain appropriate control in the fuel cell system 10 and allow the fuel cell 100 to keep generating electric power.

The output from the fuel cell 100 is temporarily restricted, for example, when the temperature of the cooling water increases, when the temperature of any of a variety of parts of the fuel cell system 10 increases, when the voltage across a single cell decreases (when the supply of the reaction gases transiently fails), and when any of a variety of other abnormalities assumed in advance is detected.

The auxiliary unit 140 is an auxiliary unit used to operate the fuel cell 100 and forms part of the reaction gas supplying mechanism 102. The auxiliary unit 140 is electrically connected to the low-voltage DC wiring lines DCL and operates by consuming the electric power supplied to the low-voltage DC wiring lines DCL. The auxiliary unit 140 includes, for example, a hydrogen circulating pump that circulates hydrogen as the anode gas to the fuel cell 100, a cooling water pump as a cooler that cools the fuel cell 100, and other components.

The motor inverter 150 converts the DC electric power supplied from the fuel cell 100 and the secondary battery 120 via the high-voltage DC wiring lines DCH into three-phase AC electric power. The motor inverter 150 is electrically connected to the drive motor 220 provided in the vehicle and supplies the drive motor 220 with the three-phase AC electric power. The motor inverter 150 further converts the regenerative electric power produced by the drive motor 220 into DC electric power and outputs the DC electric power to the high-voltage DC wiring lines DCH. The air compressor inverter 160 also converts the DC electric power supplied from the fuel cell 100 and the secondary battery 120 via the high-voltage DC wiring lines DCH into three-phase AC electric power. The air compressor inverter 160 is electrically connected to the air compressor 104 and supplies the air compressor 104 with the three-phase AC electric power.

The PM controller 170 controls the action of each portion of the fuel cell system 10. The PM controller 170 oversees and controls the action of each of the variety of controllers, such as the FC controller 180, the FDC controller 190, and the MG controller 200, to control the action of each portion of the fuel cell system 10.

The PM controller 170 transmits a signal representing an output value that the fuel cell 100 is requested to produce (hereinafter also called "FC output requirement") to the FC controller 180 in accordance with a throttle opening representing a vehicle speed adjustment instruction accepted by a throttle 210 provided in the vehicle. The throttle opening accepted by the throttle 210 is the ratio (%) of the amount of actual operation of the throttle 210 to the range over which the throttle 210 is allowed to be operated. The throttle opening is determined in accordance with the magnitude of a signal detected with a throttle sensor that is not shown.

The PM controller 170 transmits a signal that causes the fuel cell converter 110 to output electric power according to the FC output request to the FDC controller 190. The PM controller 170 transmits a signal that causes the air compressor 104 to operate in accordance with the FC output request to the MG controller 200. The PM controller 170 transmits a signal representing torque that requests the drive motor 220 (hereinafter also called "motor torque request") to operate in accordance with the throttle opening to the MG controller 200.

The FC controller 180 controls the action of the reaction gas supplying mechanism 102 in such a way that the fuel cell 100 operates (generates electric power) in accordance with the received FC output request. The reaction gas supplying mechanism 102 thus supplies the fuel cell 100 with the reaction gases in accordance with the FC output request and cools the fuel cell 100.

The FC controller 180 uses signals received from the variety of sensors and the cell monitor (not shown) to monitor the operation state of each portion of the fuel cell system 10 according to the electric power generation performed by the fuel cell 100 incorporated in the vehicle. The FC controller 180 stores the history of the operation state of each portion of the fuel cell system 10 as appropriate in a vehicle control history (or RoB: Record of Behavior) 182 in a RAM that serves as a storage section provided in the FC controller 180. The FC controller 180 stores, for example, the content of the aforementioned restriction on the output from the fuel cell 100 as the history in the vehicle control history. The vehicle control history is used for maintenance, repair, and other services in a service shop or at any other location. The history of the restriction on the output from the fuel cell 100 will be further described later.

The FDC controller 190 controls the action of the fuel cell converter 110 in such a way that the fuel cell converter 110 outputs electric power according to the received FC output request. The fuel cell converter 110 thus outputs the electric power according to the FC output request to the high-voltage DC wiring lines DCH.

The MG controller 200 is a high-voltage unit controller. The MG controller 200 controls the action of the secondary battery converter 130 and the motor inverter 150 in accordance with the signal representing the torque request received from the PM controller 170. The MG controller 200 controls the action of the air compressor inverter 160 in accordance with the received signal for operating the air compressor 104.

Each of the PM controller 170, and the FC controller 180, the FDC controller 190 and the MG controller 200 that are controlled by the PM controller 170 is a computer including a CPU, a memory, such as a ROM and a RAM, an interface, and other components. The controllers each operate as a functional controller that performs the corresponding function described above by executing software stored in the memory.

The drive motor 220 is an electric motor that is driven when the electric power is supplied from the fuel cell 100 and the secondary battery 120. When the throttle 210 accepts a speed reduction instruction, the drive motor 220 reduces the torque during a period until the operation of the drive motor 220 transitions to regenerative operation. In the present embodiment, when the throttle 210 accepts the speed reduction instruction, the drive motor 220 transitions from power traveling operation to the regenerative operation after the throttle opening becomes zero and then a fixed period elapses. In other embodiments, the drive motor 220 may transition from the power traveling operation to the regenerative operation when the torque decreases to a set value or smaller.

Figure 2:
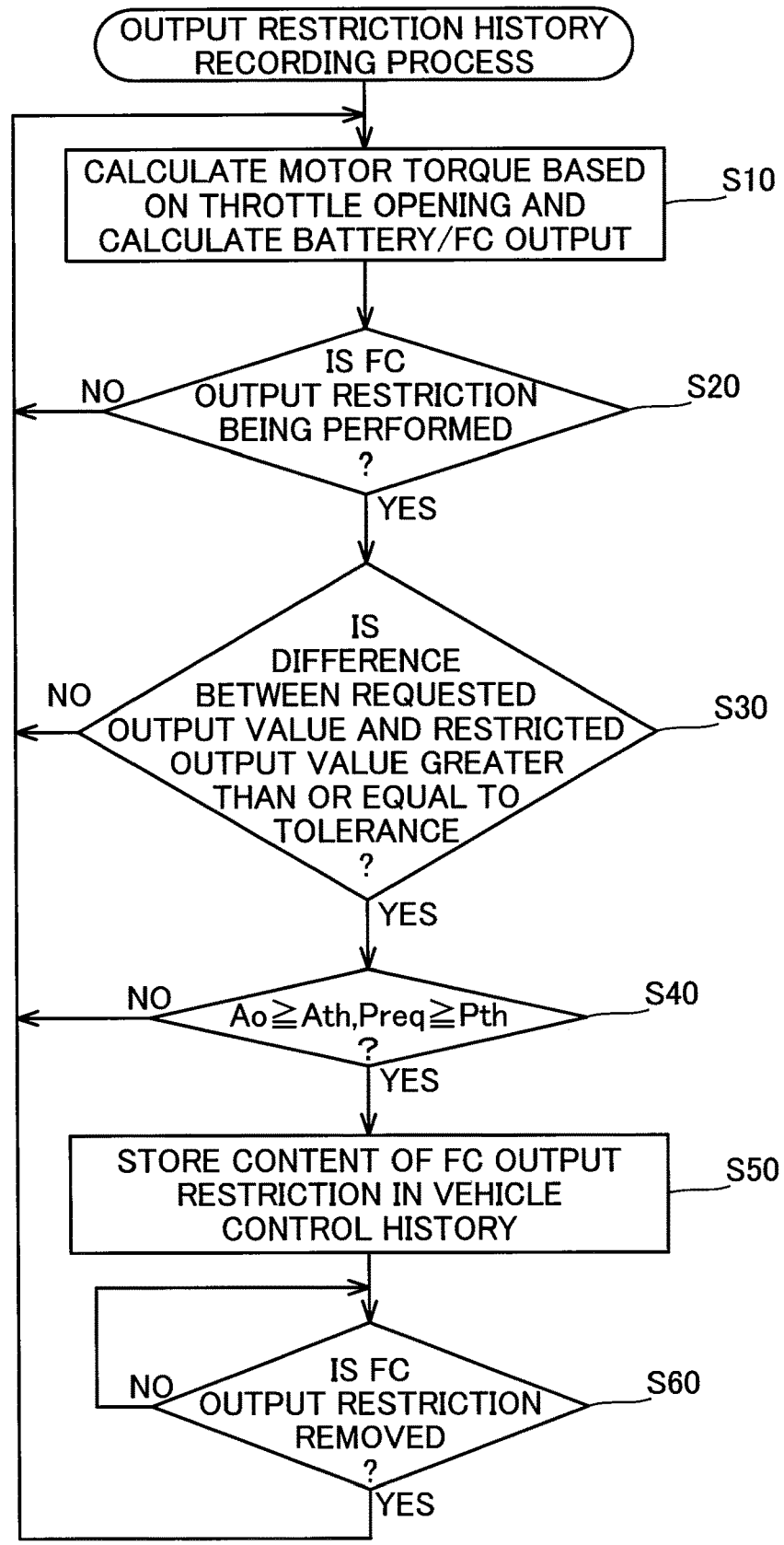
FIG. 2 is a flowchart showing the processes of controlling how to handle the history of the restriction on the output from a fuel cell.

FIG. 2 is a flowchart showing the process of recording the history of the restriction on the output from the fuel cell 100 (hereinafter also called "output restriction history recording process"). The output restriction history recording process is continuously carried out by the FC controller 180 after the power switch that is not shown is turned on so that the fuel cell system 10 (see FIG. 1) starts and during the operation of the fuel cell system 10 until the power switch is turned off so that the fuel cell system 10 stops. In the present specification, the output restriction history recording process can be taken as part of a method for controlling the fuel cell system.

First, the FC controller 180 calculates torque that the drive motor 220 is requested to produce (motor torque) based on the throttle opening Ao according to the user's operation of the throttle 210 and then calculates a requested output value that the secondary battery 120 or the fuel cell (FC) 100 is requested to output (step S10). The FC controller 180 then evaluates whether or not any of the aforementioned events that cause the restriction on the output from the fuel cell 100 (hereinafter also called "FC output restriction") to be performed has occurred and the FC output restriction is being performed (step S20).

If no event that causes the FC output restriction has occurred so that the FC output restriction is not performed, the process in step S10 is repeated. In this case, the fuel cell 100 outputs an output according to the requested output value. On the other hand, in the case where any of the events that cause the FC output restriction has occurred and the FC output restriction is being performed, the FC controller 180 further evaluates whether or not the difference between the requested output value and the restricted value of the output from the fuel cell 100 (hereinafter also called "restricted output value"), that is, an insufficient output resulting from the FC output restriction is greater than or equal to a tolerance specified in advance (step S30).

As the requested output value, the restricted output value, and the tolerance, it is preferable to use values representing the ratios (%) of a requested output value Preq, a restricted output value Plmt, and a tolerance Ptlr to the requested output value Preq or Rpreq (=100%), Rplmt, and Rptlr, respectively. That is, the FC controller 180 checks whether or not the insufficient output, which is the difference between the requested output value Rpreq and the restricted output value Rplmt (Rpreq-Rplmt) is greater than or equal to the tolerance Rptlr specified in advance. The tolerance Rptlr (Ptlr) represents a boundary value that is likely to cause the user not to feel that the output is insufficient even when the requested output value Rpreq (Preq) is smaller than the restricted output value Rplmt (Plmt).

Since the boundary value that causes a person to feel that the output is insufficient differs from individual to individual, the tolerance Rptlr is preferably set based, for example, on an experiment in consideration of the individual difference. It is, however, noted that the smaller the set tolerance Rptlr is, the more likely the FC output restriction history is stored, and hence the more likely the content of any of the other output restriction events previously stored is erased. On the other hand, the greater the set tolerance Rptlr is, the more likely the FC output restriction history is not stored, and hence the more likely the content of the FC output restriction is not stored as a history even when the user actually feels that the output is insufficient. The tolerance Rptlr is therefore preferably set in consideration of the balance between the results described above. In general, when the output decreases by at least 40%, most users are believed to feel that something is wrong, and the tolerance Rptlr is therefore preferably set, for example, at any of the values within the range expressed by 20%≤Rptlr≤40%.

As long as the insufficient amount of output (Rpreq-Rplmt) is smaller than the tolerance Rptlr, it is believed that the user is likely not to feel that the output is insufficient, and that storing the content of FC output restriction as a history has a low priority. Therefore, in this case, the processes in steps S10 and S20 are repeated. On the other hand, in a case where the insufficient amount of output (Rpreq-Rplmt) is greater than or equal to the tolerance Rptlr, the FC controller 180 checks whether the throttle opening Ao is greater than or equal to an opening threshold Ath (%) and the requested output value Preq is greater than or equal to an output threshold Pth (kw) (step S40).

In a case where Ao<Ath or Preq<Pth, it is believed that the user is likely not to feel that the output is insufficient, and that storing the content of FC output restriction has a low priority. Therefore, in this case, the process in step S10 is repeated. On the other hand, in a case where Ao≥Ath and Preq≥Pth, it is estimated that the user has felt that the output is insufficient and therefore stepped down the throttle 210 by a large amount (see FIG. 1). Therefore, in this case, the content of the performed FC output restriction is stored as a history in a vehicle control history (RoB) 182 (see FIG. 1) (step S50), and the system operates in a standby state until the FC output restriction is removed (step S60). When the FC output restriction is removed, the FC controller 180 returns to the process in step S10.

The content of FC output restriction stored in the vehicle control history (RoB) 182 contains data representing an estimated cause of the output restriction and the operation state of each portion of the fuel cell system at the event of the output restriction, that is, a variety of data required to grasp the operation state of the fuel cell system. The variety of data required to grasp the operation state of the fuel cell system includes, for example, the temperature of the fuel tank, the flow rate, the pressure, and the temperature of the reaction gases (hydrogen, air), the operation states of the variety of valves, and data obtained from the variety of sensors, such as the numbers of revolutions and other operation states of the air compressor and the hydrogen pump.

Figure 3:
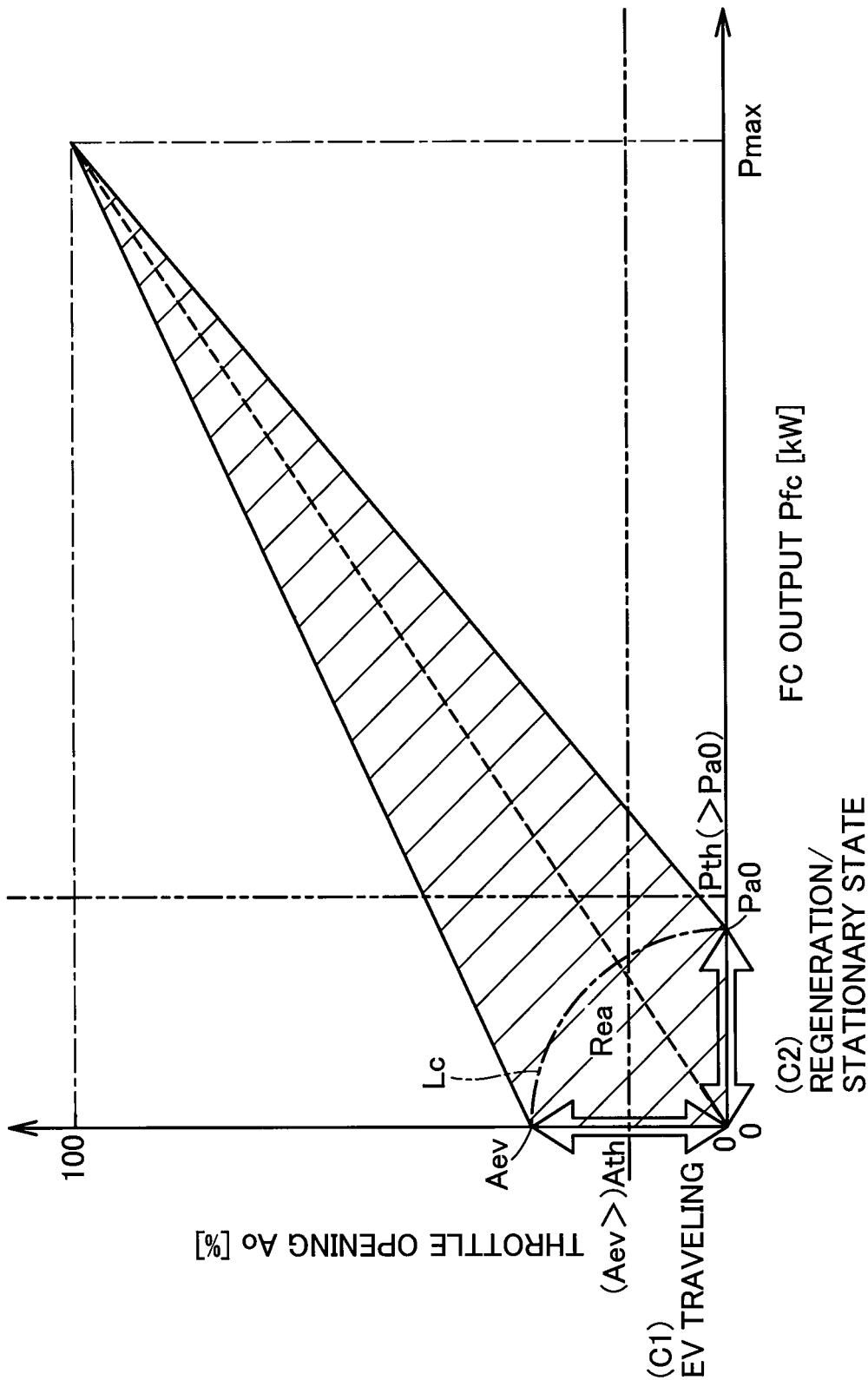
FIG. 3 is a descriptive diagram showing the settings of an opening threshold of a throttle opening and an output threshold of a requested output value.

FIG. 3 is a descriptive diagram showing the settings of the opening threshold Ath of the throttle opening Ao and the output threshold Pth of the requested output value Preq. FIG. 3 shows a graph representing the relationship between the throttle opening Ao and the FC output Pfc from the fuel cell 100 during the operation of the fuel cell system 10. The straight broken line represents a theoretical relationship in which the FC output Pfc changes in proportional to the throttle opening Ao in such a way that the FC output Pfc changes from 0 kW to Pmax (kW) when the throttle opening Ao changes from 0% to 100%.

Over the range of the throttle opening Ao from 0% to Aev (%), the actual fuel cell system 10 is operated in a region (C1) where the FC output Pfc, which is supplied from the fuel cell 100 to the drive motor 220, is 0 kW, so that the vehicle operates in EV traveling. In this case, the electric power supplied to the drive motor 220 comes from the secondary battery 120. On the other hand, the fuel cell 100 outputs, when it operates in a zero-load state (when output current is 0 A), high-potential voltage (also called "open-circuit voltage"), and degradation in the electrodes and the electrolyte membrane of each single cell is therefore likely to occur. To prevent the open-circuit voltage state of the fuel cell 100 also in the EV traveling, high-potential avoiding control based on electric power generation in which electric power is supplied to a minute load (also called "minute electric power generation") may be performed in some cases.

In the actual fuel cell system 10, the high-potential avoiding control for the fuel cell 100 based on the minute electric power generation may be performed in some cases to suppress the open-circuit voltage state, also during the regenerative action performed by the drive motor 220 when the vehicle is traveling downhill or deceleratively traveling with the throttle opening Ao set at 0% or in the stationary state of the vehicle. Therefore, during the regenerative action with the throttle opening Ao set at 0% or in the stationary state of the vehicle, the fuel cell 100 is operated in a region (C2) where the FC output Pfc under the high-potential avoiding control ranges from 0 kW to Pa0 (kW).

Figure 4:
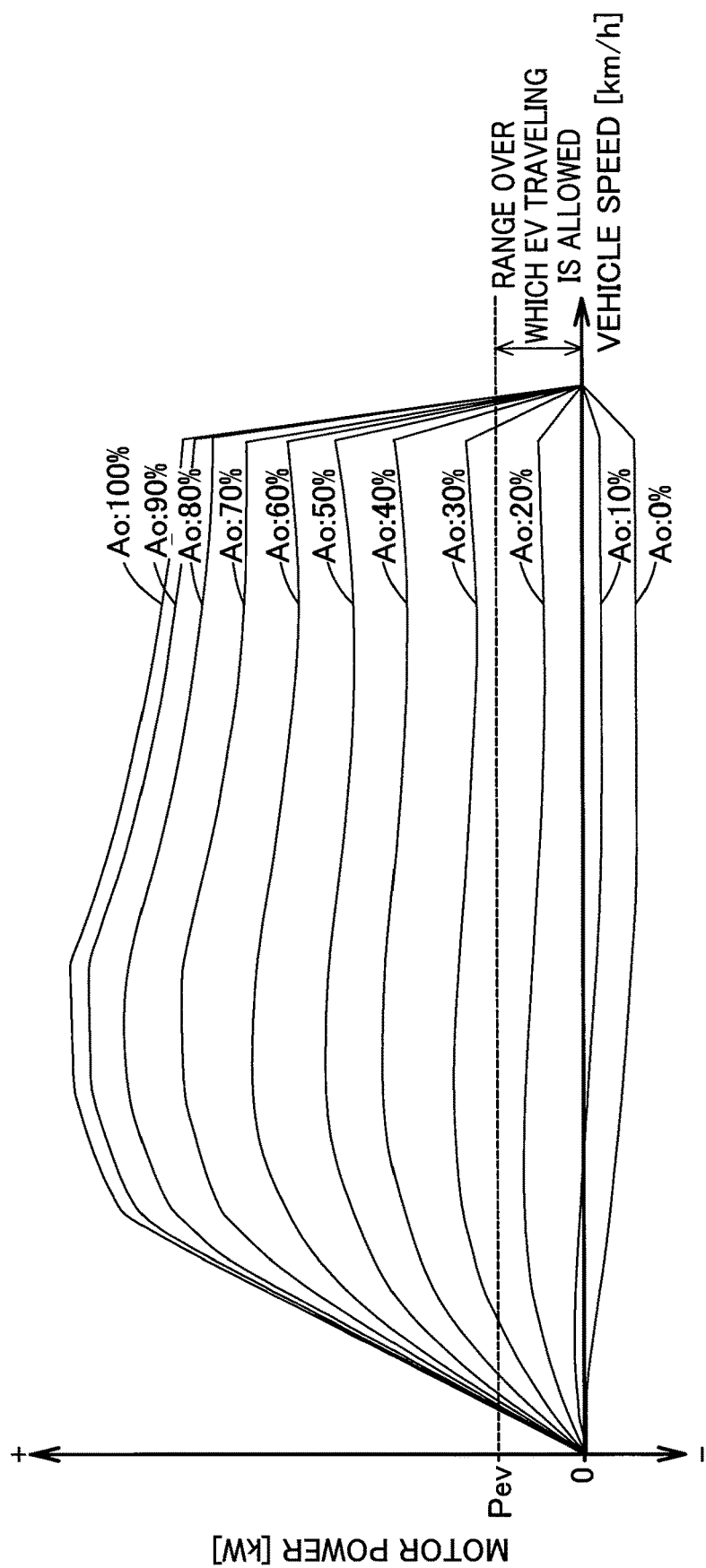
FIG. 4 shows graphs illustrating an example of a motor power map representing the power from a drive motor for each throttle opening.

Therefore, during the operation of the fuel cell system 10, the relationship between the throttle opening Ao and the FC output Pfc from the fuel cell 100 changes within the hatched region in FIG. 3. The value Aev (%) of the throttle opening Ao that allows the EV traveling and the value Pa0 (kW) of the FC output Pfc at the throttle opening Ao=0% are set, for example, as follows:

FIG. 4 shows graphs illustrating an example of a motor power map representing the power from the drive motor 220 for each throttle opening Ao. As shown in FIG. 4, for example, assuming that the range of the motor power from 0 kW to Pev (kW) is the range over which the EV traveling based on the secondary battery 120 (see FIG. 1) is allowed, the throttle opening Ao that allows the EV traveling is set at a value within the range from 0% to Aev (%), which causes traveling within the motor power range smaller than or equal to Pev. In the example shown in FIG. 4, since the throttle opening Aev (%), which causes traveling within the motor power range smaller than or equal to Pev, is a value between 20% to 30%, Aev is set, for example, at 20%.

The value Pa0 (kW) of the FC output Pfc at the throttle opening Ao=0% is set at the output electric power produced by the minute electric power generation performed under the high-potential avoiding control, as described above.

In FIG. 3, the region surrounded by a curve Lc that connects the value Aev of the throttle opening Ao to the value Pa0 of the FC output Pfc is a region where the minute electric power generation for the high-potential avoiding control in the EV traveling described above, the regenerative action, and the stationary state may be performed in some cases. The FC output restriction described above may be performed in some cases also in this region Rea. For example, the FC output restriction may be performed in some cases when hydrogen supply failure or oxygen supply failure transiently and temporarily occurs due to drainage failure and the voltage across each single cell therefore decreases to a negative value.

However, in the region Rea, which is the region where (i) the EV traveling, in which no electric power is supplied from the fuel cell 100, is performed or (ii) the throttle opening Ao is zero as described above, the user is likely not to feel that something is wrong even when the FC output restriction is performed. The region Rea is therefore believed to be a region where the content of the performed FC output restriction does not need to be stored as a history. Therefore, in the case where Ao<Aev and Preq<Pa0, it is basically believed that even when the FC output restriction is performed, the content thereof does not need to be stored as a history.

However, since the boundary value Aev of the throttle opening Ao, which corresponds to the EV traveling, and the boundary value Pa0 of the requested output value Preq, which is associated with the throttle opening Ao of 0%, are each a set value, no variation in or other factors of the boundary value are considered at all. It is therefore preferable to set, as the opening threshold Ath of the throttle opening Ao that allows the EV traveling, a value smaller than the value Aev set as the throttle opening Ao that allows the EV traveling. It is also preferable to set, as the output threshold Pth of the requested output value Preq determined by the user's output request, a value greater than the set output electric power Pa0 produced by the minute electric power generation in the high-potential avoiding control. Therefore, in step S40 in FIG. 2, the FC controller 180 checks whether the throttle opening Ao is greater than or equal to the opening threshold Ath (%) and whether the requested output value Preq is greater than or equal to the output threshold Pth (kW). In the example shown in FIG. 4, since Aev is a value between 20% and 30%, the opening threshold Ath is preferably set at a value within the range expressed by 0%<Ath≤20%. In a case where Pa0 ranges from about 7 to 8 kW, for example, the output threshold Pth is preferably set at a value within the range expressed by Pa0 (kW)<Pth≤(Pmax/10) (kW). For example, Ath and Pth can be set as follows: Ath=10% and Pth=10 kW.

Figure 5:
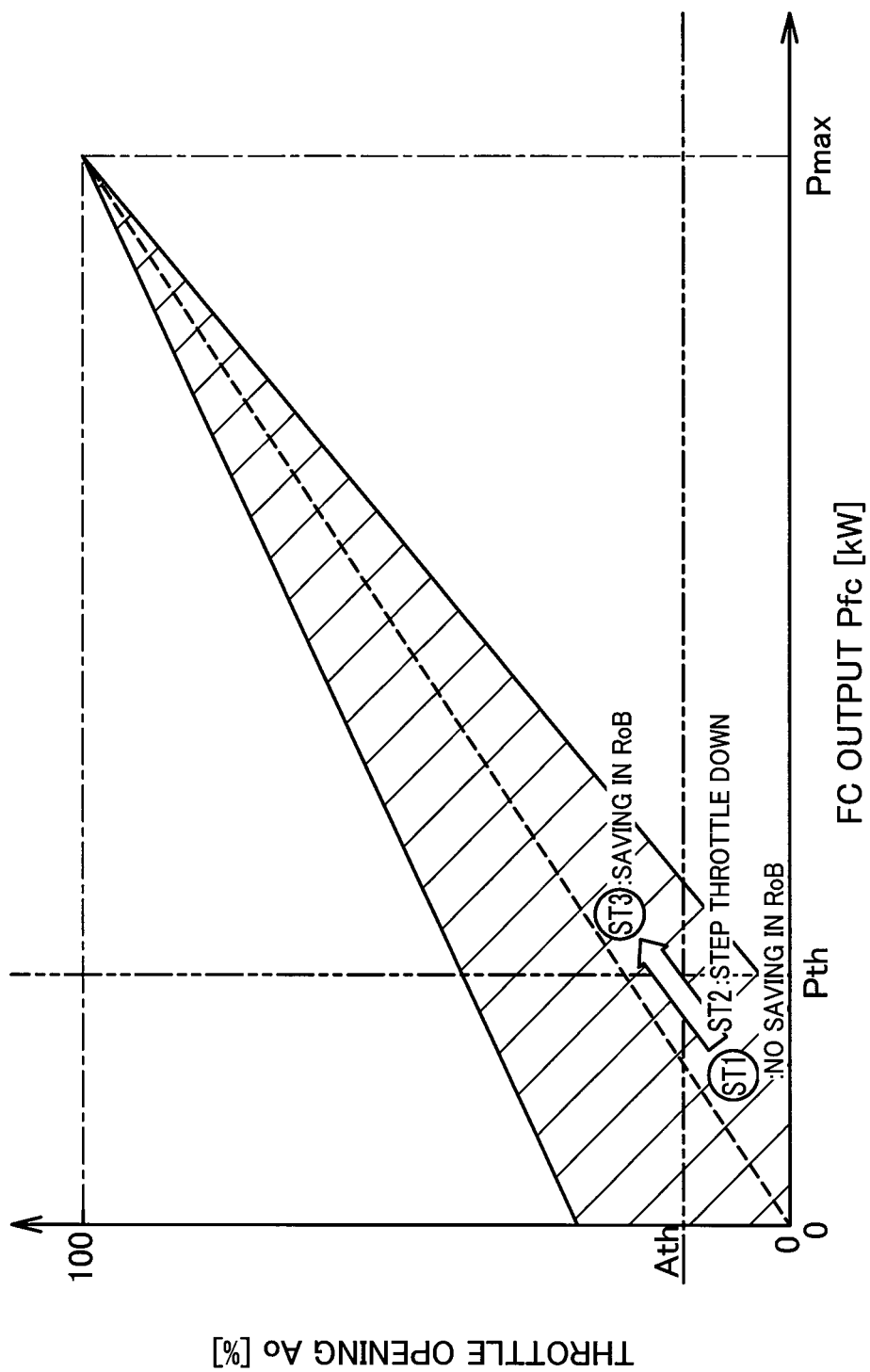
FIG. 5 is a descriptive diagram showing an example of a result of an output restriction history recording process shown in FIG. 2.

FIG. 5 is a descriptive diagram showing an example of a result of the output restriction history recording process shown in FIG. 2. FIG. 5 shows a graph representing the relationship between the throttle opening Ao and the FC output Pfc from the fuel cell 100 during the operation of the fuel cell system 10, as in the case of FIG. 3.

In a state ST1 shown in FIG. 5, in which the throttle opening Ao is smaller than Ath or the requested output value Preq is smaller than Pth, even if the FC output restriction is performed (Yes in step S20 in FIG. 2), the content of the FC output restriction is not stored in the vehicle control history RoB (No in step S40 in FIG. 2). On the other hand, in a case where the FC output restriction is performed in the state ST1 and the user feels that the output is insufficient, the user steps down the throttle 210 by a larger amount to cause the state ST1 to transition to a state ST2 in FIG. 5. The FC controller 180 determines that the state ST1 has transitioned to the state ST2 when the FC controller 180 determines that (Rpreq-Rplmt) is greater than or equal to Rptlr in step S30 in FIG. 2. As a result of the transition to the state ST2, a state ST3 is achieved, and in a case where the FC controller 180 determines that the throttle opening Ao is greater than or equal to Ath and the requested output value Preq is greater than or equal to Pth (Yes in step S40 in FIG. 2), the content of the performed FC output restriction is stored in the vehicle control history RoB (step S50).

As described above, the fuel cell system 10 according to the present embodiment is controlled, even when an event that causes the FC output restriction has occurred and the FC output restriction is performed, such that the content of the FC output restriction is not stored as a history in the case where an output request corresponding to the user's operation of the throttle 210 is likely to be satisfied (see S30 and S40 in FIG. 2). As a result, even in the aspect in which past histories are erased when the amount of a plurality of pieces of information on the FC output restriction that should be stored is greater than the capacity of the memory, the content of FC output restriction that is likely to cause the user to feel that the output is insufficient (Yes in S30 and Yes in S40 in FIG. 2) can be more likely to be held as a history, instead of being erased. As a result, the insufficient output felt by the user can be readily confirmed in a service shop or at any other location to which the user has brought the vehicle. Further, since the content of the FC output restriction left as a history coincides with the problem recognized by the user (insufficient output), the problem is readily analyzed, whereby a result of the analysis can readily help, for example, solve the problem.

B. Other Embodiments (1) In the output restriction history recording process (see FIG. 2) in the embodiment described above, when the FC output restriction is performed (Yes in step S20), the case where the difference between a requested output value and a restricted output value (insufficient amount of output) is greater than or equal to a tolerance (Yes in step S30) is the case where a predetermined condition is satisfied. In a case where the condition is satisfied while the throttle opening Ao is greater than or equal to the opening threshold Ath (%) and the requested output value Preq is greater than or equal to the output threshold Pth (kw) (Yes in step S40), the content of the FC output restriction is stored as a history (step S50).

The output restriction history recording process is, however, not limited to the process described above, and a case where step S30 is omitted and the FC output restriction is only performed may be the case where the predetermined condition is satisfied. It is, however, noted that the output restriction history recording process preferably includes step S30, as in the embodiment described above. In the case where the difference between a requested output value and a restricted output value (insufficient amount of output) is smaller than a tolerance, the user is likely not to have felt that the output is insufficient. Therefore, even in the case where the FC output restriction is performed, the configuration in which the output restriction history recording process includes step S30 is more likely to allow the content of the performed FC output restriction not to be stored as a history. The content of the FC output restriction in the case where the user is likely to have felt that the output is insufficient and have issued an output request can therefore be more likely to be left as a history, whereby the situation in which the user feels that something is wrong can be more likely to be improved.

Further, a case where the vehicle speed is greater than or equal to a threshold specified in advance, a case where a change in the vehicle speed is greater than or equal to a threshold specified in advance, and other cases may be employed as the case where the predetermined condition is satisfied.

(2) In the output restriction history recording process (see FIG. 2) in the embodiment described above, once the content of performed FC output restriction is stored as a history in the vehicle control history (RoB) 182 (see FIG. 1) (step S50), the system operates in the standby state until the FC output restriction is removed (step S60), and the processes in step S10 to S50 are not carried out, but not necessarily, and the processes that will be described below may be carried out.

After the content of the FC output restriction is stored as a history (step S50), and after a fixed period elapses in the standby state, the FC controller 180 may return to step S10 and repeats the processes in step S10 and the following steps not to repeatedly store the content of the same FC output restriction as a history.

Further, until the FC output restriction is removed (No in step S60), and whenever the content of FC output restriction is stored as a history (step S50), the values of the opening threshold Ath and the output threshold Pth (see FIGS. 3 and 5) may be changed to greater values, and only in a case where the condition of step S40 is still satisfied, the content of FC output restriction may be stored as a history. The processes described above can prevent the content of the same FC output restriction from being repeatedly stored and, in a case where the state of the FC output restriction changes, allow a change in the state of the FC output restriction to be stored as a history.

The process in step S60 may be omitted. In this case, the content of the same FC output restriction is more likely to be stored as a history than in the case where step S60 is not omitted, but the content of FC output restriction in the case where Ao<Ath and Preq<Pth can be more likely not to be stored as a history (No in S40), and the contents of FC output restriction that should be stored can be more likely to be held.

In some aspect, the controller does not store the content of the performed output restriction as a history in a case where a condition specified in advance is satisfied while the throttle opening is equal to the opening threshold and the output request is equal to the output threshold. In another aspect, the controller stores the content of the performed output restriction as a history in a case where the condition specified in advance is satisfied while the throttle opening is greater than the opening threshold and the output request is greater than the output threshold.

(3) The embodiments described above have been described with reference to the fuel cell system incorporated in a vehicle, but not necessarily, and the embodiments are also applicable to a fuel cell system incorporated in a moving object, such as a ship and an airplane using electric power as the drive source.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to a form of the present disclosure, a fuel cell system incorporated in a vehicle is provided. The fuel cell system includes a fuel cell that uses a reaction gas to generate electric power and a controller that controls the electric power generation performed by the fuel cell. When output restriction that restricts the electric power output by the fuel cell is performed, (a) the controller does not store a content of the performed output restriction as a history in a case where a throttle opening of a throttle is smaller than an opening threshold or an output request is smaller than an output threshold, the throttle accepting an instruction of adjusting a speed of the vehicle, the output request being issued to the fuel cell and set in accordance with the throttle opening, and (b) the controller stores the content of the performed output restriction as a history in a case where a condition specified in advance is satisfied while the throttle opening is greater than the opening threshold and the output request is greater than the output threshold.

In the form described above, when the output restriction is performed, and in the case where the throttle opening is smaller than the opening threshold or the output request is smaller than the output threshold, the output restriction is likely to be the output restriction of the second type described above. Therefore, the user is likely not to feel that the output from the vehicle is insufficient and that something is wrong, so that the user is likely not to have issued an output request for compensation of insufficient output via throttle operation. Further, when the output restriction is performed, and in the case where the throttle opening is greater than the opening threshold and the output request is greater than the output threshold, the output restriction is likely to be the output restriction of the first type described above. The user is therefore likely to have felt that the output is insufficient and issued an output request via throttle operation.

The form described above therefore prevents the content of the performed restriction on the output from the fuel cell from being stored as a history in the case where the user is likely not to have issued an output request but allows the content of the performed restriction on the output from the fuel cell to be stored as a history in the case where the user is likely to have felt that the output is insufficient and issued an output request. As a result, the content of the fuel cell output restriction performed in the case where the user is likely to have felt that the output is insufficient and issued an output request is likely to be kept stored instead of being erased, whereby the situation in which the user feels that something is wrong is likely to be solved.

(2) In the fuel cell system according to the form described above, the condition specified in advance may be satisfied in a case where a difference between the output request and an output in the performed output restriction is greater than or equal to a tolerance.

In the case where the difference between the output request and the output in the performed output restriction is smaller than the tolerance, the user is likely not to have felt that the output is insufficient. Therefore, according to the form described above, even when the fuel cell output restriction is performed, but in the case where the difference between the output request and the output in the performed output restriction is smaller than the tolerance, the content of the performed fuel cell output restriction is not allowed to be stored as a history. As a result, the content of the fuel cell output restriction performed in the case where the user is likely to have felt that the output is insufficient and issued an output request is likely to be stored as a history, whereby the situation in which the user feels that something is wrong is more likely to be solved.

(3) In the fuel cell system according to the form described above, once the process (b) of storing the content of the performed output restriction as a history is carried out, the controller may be configured not to carry out the process (b) until the performed output restriction is removed.

According to the form described above, once the content of the performed output restriction is stored as a history, and when the output restriction continues, the situation in which the same content is repeatedly stored and the content of another output restriction event previously stored is therefore erased can be avoided.

The forms of the present disclosure are not necessarily a fuel cell system and can also be a variety of other forms, such as a fuel cell system incorporated, for example, in a vehicle or a ship using electric power as the drive source, a vehicle itself, and a ship itself. Further, the present disclosure can be implemented in an aspect of a method for controlling a fuel cell system. Moreover, the present disclosure is not limited to the forms described above at all and can be implemented in a variety of other forms to the extent that they do not depart from the spirit of the present disclosure.

What is claimed is:

1. A fuel cell system incorporated in a vehicle, the fuel cell system comprising:
   a fuel cell that uses a reaction gas to generate electric power; and
   a controller that controls an electric power generation performed by the fuel cell, wherein when output restriction that restricts the electric power output by the fuel cell is performed,
   (a) the controller does not store in a memory of the controller a content of the performed output restriction as a history in a case where: (i) a throttle opening of a throttle is smaller than an opening threshold, (ii) an output request is smaller than an output threshold, or (iii) both the throttle opening of the throttle is smaller than the opening threshold and the output request is smaller than the output threshold, the throttle accepting an instruction of adjusting a speed of the vehicle, the output request being issued to the fuel cell and set in accordance with the throttle opening, and
   (b) the controller stores in the memory the content of the performed output restriction as the history in a case where a condition specified in advance is satisfied while the throttle opening is greater than the opening threshold and the output request is greater than the output threshold.

2. The fuel cell system in accordance with claim 1, wherein when the condition specified in advance is satisfied, in a case where a difference between the output request and an output in the performed output restriction is greater than or equal to a tolerance, the controller stores the content of the performed output restriction as the history.

3. The fuel cell system in accordance with claim 1, wherein once the controller carries out the process (b) of storing the content of the performed output restriction as the history, the controller does not carry out the process (b) until the performed output restriction is removed.

4. A method for controlling a fuel cell system, the fuel cell system being incorporated in a vehicle and including a fuel cell and a controller, the fuel cell using a reaction gas to generate electric power, the controller controlling the fuel cell, the method comprising controlling the fuel cell system such that:
   when output restriction that restricts the electric power output by the fuel cell is performed,
   (a) the controller does not store in a memory of the controller a content of the performed output restriction as a history in a case where: (i) a throttle opening of a throttle is smaller than an opening threshold, (ii) an output request is smaller than an output threshold, or (iii) both the throttle opening of the throttle is smaller than the opening threshold and the output request is smaller than the output threshold, the output request being issued to the fuel cell and set in accordance with the throttle opening, and
   (b) the controller stores in the memory the content of the performed output restriction as the history in a case where a condition specified in advance is satisfied while the throttle opening is greater than the opening threshold and the output request is greater than the output threshold.

5. The method for controlling the fuel cell system in accordance with claim 4, wherein when the condition specified in advance is satisfied, in a case where a difference between the output request and an output in the performed output restriction is greater than or equal to a tolerance, the controller stores the content of the performed output restriction as the history.

6. The method for controlling the fuel cell system in accordance with claim 4, wherein once the controller carries out the process (b) of storing the content of the performed output restriction as the history, the controller does not carry out the process (b) until the performed output restriction is removed.

* * * * *